US012745247B2

(12) United States Patent
Li

(10) Patent No.: US 12,745,247 B2
(45) Date of Patent: Sep. 22, 2026

(54) METHOD AND APPARATUS FOR MONITORING PHYSICAL DOWNLINK CONTROL CHANNEL, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 386 days.

(21) Appl. No.: 18/559,139

(22) PCT Filed: May 7, 2021

(86) PCT No.: PCT/CN2021/092228

§ 371 (c)(1),
(2) Date: Nov. 6, 2023

(87) PCT Pub. No.: WO2022/233060

PCT Pub. Date: Nov. 10, 2022

(65) Prior Publication Data

US 2024/0244620 A1 Jul. 18, 2024

(51) Int. Cl.
*H04W 72/1273* (2023.01)
*H04B 7/06* (2006.01)
(Continued)

(52) U.S. Cl.
CPC .... *H04W 72/1273* (2013.01); *H04B 7/06968* (2023.05); *H04W 16/28* (2013.01); *H04W 76/20* (2018.02)

(58) Field of Classification Search
None
See application file for complete search history.

(56) References Cited

U.S. PATENT DOCUMENTS

2021/0050936 A1* 2/2021 Seo ....................... H04L 5/0053
2021/0127389 A1 4/2021 Liu et al.

FOREIGN PATENT DOCUMENTS

CN 110832919 A 2/2020
CN 110972515 A 4/2020
(Continued)

OTHER PUBLICATIONS

International Search Report and Written Opinion of International Application No. PCT/CN2021/092228, dated Nov. 29, 2021, 15 pages.

(Continued)

*Primary Examiner* — Walter J Divito
(74) *Attorney, Agent, or Firm* — Finnegan, Henderson, Farabow, Garrett & Dunner, L.L.P.

(57) ABSTRACT

A method for monitoring a physical downlink control channel (PDCCH), includes: determining at least one of one or more specified control resource sets (CORESETs) or one or more pieces of specified beam information, wherein a terminal needs to monitor a plurality of PDCCHs at an overlapping occasion; and monitoring a PDCCH of the one or more specified CORESETs and a PDCCH of another CORESET with same beam information as the one or more specified CORESETs at the overlapping occasion, or monitoring a PDCCH of a CORESET with beam information being the same as the specified beam information at the overlapping occasion.

17 Claims, 3 Drawing Sheets

(51) Int. Cl.
*H04W 16/28* (2009.01)
*H04W 76/20* (2018.01)

(56) References Cited

FOREIGN PATENT DOCUMENTS

| | | | |
|---|---|---|---|
| CN | 111314035 | A | 6/2020 |
| CN | 112399584 | A | 2/2021 |
| EP | 3629645 | A1 | 4/2020 |
| JP | 2020532900 | A | 11/2020 |
| WO | WO 2020146647 | A1 | 7/2020 |

OTHER PUBLICATIONS

Notice of the first review opinion, for Chinese Application No. 202180001527.4, issued on Jul. 6, 2022, 16 pages.
Notice of the second review opinion, for Chinese Application No. 202180001527.4, issued on Mar. 4, 2023, 20 pages.
Moderator (QualComm), "Summary #3 of email discussions [104b-e-NR-feMIM0-02] for mTRP PDCCH enhancements", 3GPP TSG-RAN WG1 Meeting #104-bis-e, R1-2103915, e-Meeting, Apr. 12-Apr. 20, 2021, 15 pages.
Moderator (QualComm), "Summary #2 of email discussions [104b-e-NR-feMIM0-02] for mTRP PDCCH enhancements", 3GPP TSG-RAN WG1 Meeting #104-bis-e, R1-2103820, e-Meeting, Apr. 12-Apr. 20, 2021, 22 pages.
3GPP TS 38.213 V16.3.0 (Sep. 2020), 3rd Generation Partnership Project; Technical Specification Group Radio Access Network; NR; Physical layer procedures for control (Release 16), 179 pages.
Notice of the first review opinion for Japanese Patent Application No. 2023-568338, dated Oct. 18, 2024, 6 pages.
Extended European Search Report issued in Application No. 21939706.4 dated Feb. 17, 2025, 21 pages.
"Discussion of search space design", Guangdong OPPO Mobile Telecom, 3GPP TSG RAN WG1 Meeting NR#3, R1-1715686, Nagoya, Japan, Sep. 18-21, 2017, 13 pages.
"On PDDCH-based power saving techniques", Nokia, Nokia Shanghai Bell, 3GPP TSG RAN WG1 meeting #98bis, R1-1911245, Chongqing, China, Oct. 14-20, 2019, 13 pages.
"Discussion on PDDCH-based power saving signal/channel", LG Electronics, 3GPP TSG RAN WG1 meeting #98, R1-1908548, Prague, Czech Republic, Aug. 26-30, 2019, 5 pages.
"Remaining issues on physical downlink control channel", vivo, 3GPP TSG RAN WG1 meeting #95, R1-1812288, Spokane, USA, Nov. 12-16, 2018, 3 pages.
Office Action for Russian Patent Application No. 2023131747/07(070270), dated Jun. 13, 2024, 12 pages.
"Further details on Multi-beam and Multi-TRP operation", ZTE, 3GPP TSG RAN WG1 Meeting #104b-e, R1-2102667, e-Meeting, Apr. 12-20, 2021, 18 pages.
Office Action issued by the Korean Patent Office on Nov. 5, 2025, in corresponding KR Application No. 10-2023-7041176, 11 pages.

* cited by examiner

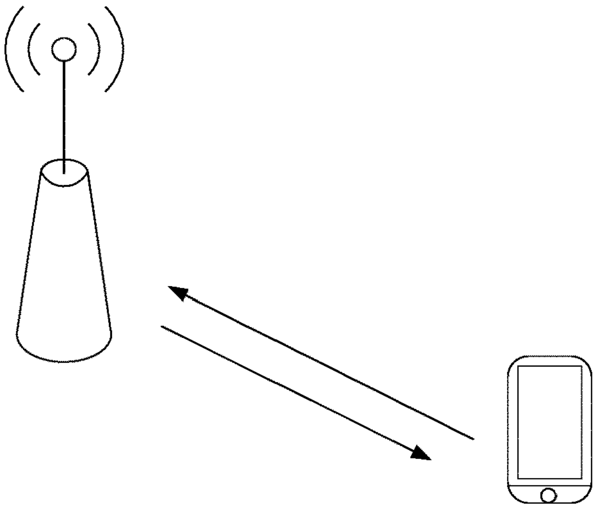

FIG. 1 in response to a terminal needing to monitor a plurality of PDCCHs at an overlapping occasion, determining at least one specified control resource set (CORESET) and/or at least one piece of specified beam information — S11 monitoring a PDCCH of the specified CORESET and a PDCCH of another CORESET with same beam information as the specified CORESET at the overlapping occasion — S12a monitoring a PDCCH of a CORESET with beam information being the same as the specified beam information at the overlapping occasion — S12b

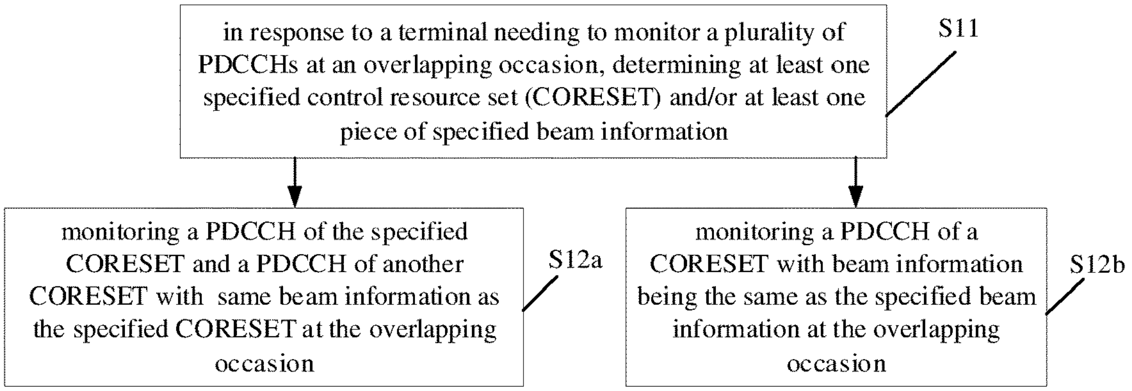

FIG. 2 selecting a CORESET that includes an CSS set among the CORESETs corresponding to the plurality of PDCCH candidates that need to be monitored at the overlapping occasion — S21 selecting a serving cell with a smallest serving cell index among serving cells of the CORESET that includes the CSS set — S22 determining a CSS set with a smallest CSS set index in the serving cell with the smallest serving cell index, determining a CORESET corresponding to the CSS set with the smallest CSS set index as the specified CORESET, and/or determining at least one piece of beam information of a CORESET corresponding to the CSS set with the smallest CSS set index as the specified beam information — S23

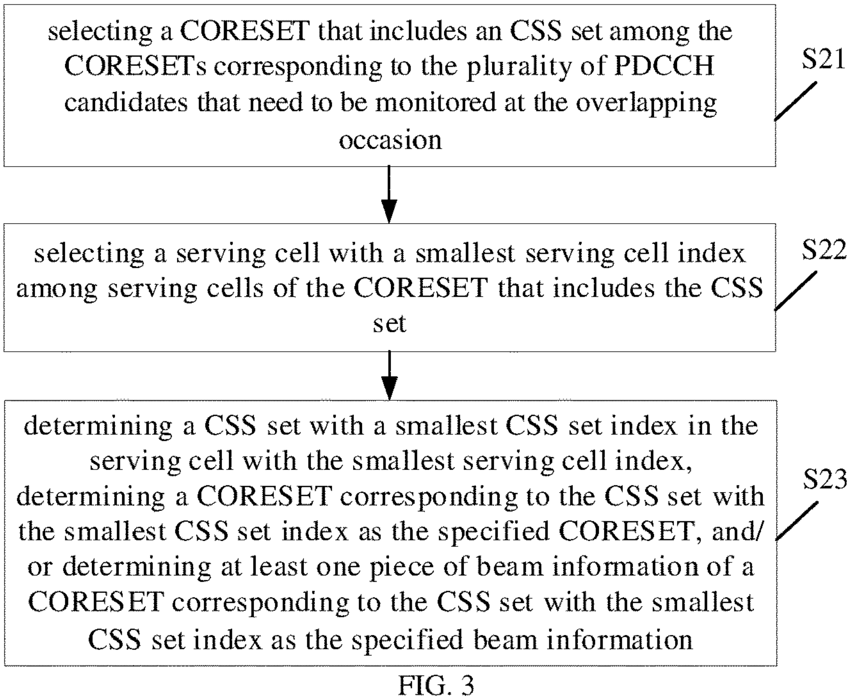

204 memory processing component

216 communication component

206 power supply component

220 processor

208 multimedia component

214 sensor component

210 audio component

212

I/O interface

METHOD AND APPARATUS FOR MONITORING PHYSICAL DOWNLINK CONTROL CHANNEL, AND STORAGE MEDIUM

CROSS-REFERENCE TO RELATED APPLICATION

This application is the U.S. National Stage Application of International Application No. PCT/CN2021/092228, filed on May 7, 2021, the entire disclosure of which is incorporated herein by reference.

TECHNICAL FIELD

The disclosure relates to a field of communication technologies, and specifically to a method and an apparatus for monitoring a physical downlink control channel, and a storage medium.

BACKGROUND

In New Radio (NR) technology, for example, when the communication frequency band is in the frequency range 2, there is a need to use beam-based transmission and reception in order to ensure coverage, since the high-frequency channel attenuates quickly.

SUMMARY

According to a first aspect of the disclosure, a method for monitoring a PDCCH is provided. The method includes: determining at least one of one or more specified CORESETs or one or more pieces of specified beam information, in which a terminal needs to monitor a plurality of PDCCHs at an overlapping occasion; and monitoring a PDCCH of the specified CORESET and a PDCCH of another CORESET with same beam information as the specified CORESET at the overlapping occasion, or monitoring a PDCCH of a CORESET with beam information being the same as the specified beam information at the overlapping occasion.

According to a second aspect of the disclosure, a device for monitoring a physical downlink control channel is provided, which includes: a processor; and a memory for storing instructions executable by the processor. The processor is configured to: determine at least one of one or more CORESETs or one or more pieces of specified beam information, in which a terminal needs to monitor a plurality of PDCCHs at an overlapping occasion; and monitor a PDCCH of the specified CORESET and a PDCCH of another CORESET with same beam information as the specified CORESET at the overlapping occasion, or monitor a PDCCH of a CORESET with beam information being the same as the specified beam information at the overlapping occasion.

According to a third aspect of the disclosure, a non-transitory computer-readable storage medium storing instructions is provided. When the instructions in the storage medium are executed by a processor of a terminal, the terminal is caused to execute a method for monitoring a physical downlink control channel. The method includes: determining at least one of one or more specified CORESETs or one or more pieces of specified beam information, in which a terminal needs to monitor a plurality of PDCCHs at an overlapping occasion; and monitoring a PDCCH of the specified CORESET and a PDCCH of another CORESET with same beam information as the specified CORESET at the overlapping occasion, or monitoring a PDCCH of a CORESET with beam information being the same as the specified beam information at the overlapping occasion.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure.

FIG. 1 is a schematic diagram illustrating a wireless communication system according to an embodiment.

FIG. 2 is a flowchart illustrating a method for monitoring a PDCCH according to an embodiment.

FIG. 3 is a flowchart illustrating a method for monitoring a PDCCH according to an embodiment.

DETAILED DESCRIPTION

Figure 4:
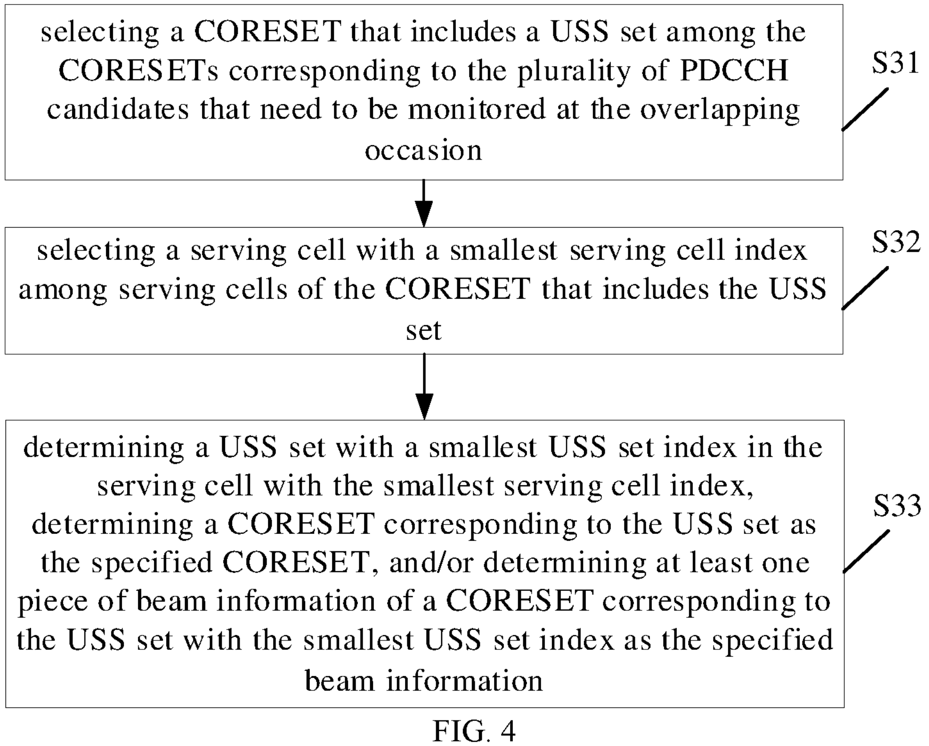
FIG. 4 is a flowchart illustrating a method for monitoring a PDCCH according to an embodiment.

The embodiments may be described in detail herein, examples of which are illustrated in the accompanying drawings. When the following description refers to the drawings, the same numbers in different drawings refer to the same or similar elements unless otherwise indicated. The implementations described in the following embodiments do not represent all the implementations consistent with the disclosure. Rather, they are merely embodiments of apparatus and methods consistent with some aspects of the disclosure as detailed in the appended claims.

The method for monitoring a PDCCH according to the embodiments of the disclosure may be applied in a wireless communication system as illustrated in FIG. 1. The wireless communication system includes a terminal and a network device. The terminal connects with the network device and performs data transmission and reception via wireless resources.

It may be understood that the wireless communication system shown in FIG. 1 is only a schematic illustration, and the wireless communication system may also include other network device, such as a core network device, a wireless relay device, a wireless backhaul device, etc. not shown in FIG. 1. The embodiments of the disclosure do not limit the number of network devices and terminals included in the wireless communication system.

It may be further understood that the wireless communication system in the embodiments of the disclosure is a network that provides wireless communication functions. The wireless communication system may use different communication technologies, such as code division multiple access (CDMA), wideband code division multiple access (WCDMA), and time division multiple access (TDMA), frequency division multiple access (FDMA), orthogonal frequency-division multiple access (OFDMA), single carrier FDMA (SC-FDMA), carrier sense multiple access with collision avoidance. According to the capacity, speed, delay and other factors of different networks, the network may be divided into a 2nd generation (2G) network, a 3G network, a 4G network or a future evolution network (such as a 5G network). The 5G network may also be called new radio (NR). For convenience of description, this disclosure sometimes refers to the wireless communication network as simply a network.

Furthermore, the network device involved in this disclosure may also be called a wireless access network device. The wireless access network device may be: a base station, an evolved node B (eNB), a home base station, an access point (AP) in a wireless fidelity (WIFI) system, or a wireless relay node, a wireless backhaul node, a transmission point (TP) or a transmission and reception point (TRP), etc., can also be a gNB in the NR system, or may also be a component, a part of device or the like that constitutes the base station. When it is a vehicle-to-everything (V2X) communication system, the network device may also be a vehicle-mounted device. It should be understood that in the embodiments of the disclosure, there are no limitations on the specific technology and specific device form used by the network device.

Furthermore, the terminal involved in this disclosure may also be called a terminal device, a user equipment (UE), a mobile station (MS), a mobile terminal (MT), etc., which is a device that provides voice and/or data connectivity for a user. For example, the terminal may be a handheld device, a vehicle-mounted device, etc. with wireless connectivity capabilities. Currently, some examples of the terminal are a mobile phone, a pocket personal computer (PPC), a palm computer, a personal digital assistant (PDA), a notebook computer, a tablet computer, a wearable device, or a vehicle-mounted device, etc. In addition, when it is a vehicle-to-everything (V2X) communication system, the terminal device may also be a vehicle-mounted device. It should be understood that the embodiments of the disclosure do not limit the specific technology and specific device form used by the terminal.

In the related art, since it is considered that a terminal may only use one beam to receive a physical downlink control channel (PDCCH) sent by a network device, when monitor occasions corresponding to a plurality of PDCCH candidates are overlapped and when quasi-colocation (QCL) beam information (such as, QCL Type D) of control resource sets (CORESETs) corresponding to the plurality of PDCCH candidates is different, then the terminal needs to determine a specified CORESET at this overlapping monitor occasion, and uses QCL Type D corresponding to the specified CORESET to monitor at this overlapping monitor occasion, a PDCCH corresponding to the specified CORESET and a PDCCH corresponding to other CORESET with QCL Type D being the same as that of the specified CORESET.

Since the terminal may only use one QCL Type D to monitor a PDCCH at the overlapping monitor occasion, the terminal will not be able to receive PDCCHs monitored by using different QCL Type Ds, which reduces a PDCCH transmission success rate. In some examples, the terminal will support the use of multiple QCL Type Ds (typically 2 QCL Type Ds) to receive a plurality of PDCCHs at the same time. Therefore, one or more CORESETs need to be determined at the overlapping monitor occasion, so that the terminal may use one or more QCL Type Ds corresponding to one or more CORESETs to monitor a plurality of PDCCHs at the overlapping monitor occasion. However, there is currently no solution for how to determine one or more CORESETs for monitoring the PDCCHs.

In this disclosure, data transmission is performed between the network device and the terminal based on beams. In some examples, during beam-based data transmission, the terminal may only use one beam to receive a PDCCH sent by the network device. Therefore, when the monitor occasions corresponding to a plurality of PDCCH candidates are overlapped and when beam information of CORESETs corresponding to the plurality of PDCCH candidates is different, for example the QCL Type D is different, then the terminal needs to determine a specified CORESET at this overlapping monitor occasion, and uses QCL Type D corresponding to the specified CORESET to monitor at this overlapping monitor occasion, a PDCCH corresponding to the specified CORESET and a PDCCH corresponding to other CORESET with QCL Type D being the same as that of the specified CORESET. That is, the terminal may only use one QCL Type D to monitor a PDCCH at the overlapping monitor occasion. Therefore, the terminal will not be able to receive PDCCHs monitored by using different QCL Type Ds, which reduces the PDCCH transmission success rate. In some examples, the terminal will support the use of multiple QCL Type Ds (typically 2 QCL Type Ds) to receive a plurality of PDCCHs at the same time. Therefore, one or more CORESETs may be determined at the overlapping monitor occasion, allowing the terminal to use one or more QCL Type Ds corresponding to one or more CORESETs to monitor a plurality of PDCCHs at the overlapping monitor occasion, which improves a PDCCH reception success rate.

The embodiments of the disclosure provide a method for monitoring a PDCCH. When a terminal needs to monitor a plurality of PDCCHs at an overlapping occasion, the terminal determines one or more specified CORESETs and/or one or more specified beam information, monitors a PDCCH of the specified CORESET at the overlapping occasion as well as a PDCCH of another CORESETs whose beam information is the same as beam information of the specified CORESET, or monitor a PDCCH of a CORESET whose beam information is the same as the specified beam information at the overlapping occasion, which improves the PDCCH reception success rate.

In the embodiment of the disclosure, the beam information may be determined based on a transmission configuration indication (TCI state). The TCI state may indicate a plurality of QCL Types, including the QCL Type D. For convenience of description, in the following embodiments, the beam information is the QCL Type D as an example. It may be understood that the beam information in the embodiment of the disclosure may also include other QCL information.

When the terminal needs to monitor a plurality of PDCCHs at an overlapping occasion, QCL Type D configured by CORESETs corresponding to a plurality of PDCCH candidates that the terminal needs to monitor at the overlapping PDCCH monitoring occasion is the same or different.

FIG. 2 is a flowchart illustrating a method for monitoring a PDCCH according to an embodiment. As shown in FIG. 2, the method for monitoring a PDCCH includes the following steps.

At S11, in response to the terminal needing to monitor a plurality of PDCCHs at an overlapping occasion, at least one specified CORESET and/or at least one piece of specified beam information are determined.

At S12*a*, a PDCCH of the specified CORESET and a PDCCH of another CORESET with same beam information as the specified CORESET are monitored at the overlapping occasion.

At S12*b*, a PDCCH of a CORESET with beam information being the same as the specified beam information is monitored at the overlapping occasion.

It may be understood that in the embodiment of the disclosure, one of the steps at S12*a* and S12*b* may be executed, or the steps at S12*a* and S12*b* may be executed separately or together.

It may be understood that in the embodiment of the disclosure, determining at least one specified CORESET may be determining one or more specified CORESETs. In the embodiment of the disclosure, determining at least one piece of specified beam information may be determining one or more pieces of specified beam information.

It may be further understood that in the embodiment of the disclosure, other CORESETs whose beam information is the same as the beam information of the specified CORESET may include another CORESET having at least one piece of beam information that is the same as at least one piece of beam information of the specified CORESET. That is, at least one beam of the specified CORESET is selected to monitor the PDCCH. In the embodiment of the disclosure, monitoring the PDCCH of the CORESET with beam information being the same as the specified beam information may include at least one piece of beam information of the CORESET that is the same as at least one piece of specified beam information.

That is, in the embodiment of the disclosure, a PDCCH of the specified CORESET and a PDCCH of another CORESET with beam information being the same as at least one piece of beam information of the specified CORESET may be monitored at the overlapping occasion, or a PDCCH of a CORESET with beam information being the same as at least one piece of specified beam information may be monitored at the overlapping occasion.

In the method for monitoring a PDCCH according to the embodiments of the disclosure, on the one hand, the specified CORESET may be one CORESET that may be configured with one or more TCI states. On the other hand, the specified CORESET may be a plurality of CORESETs, each of which is configured with one or more TCI states.

In the method for monitoring a PDCCH according to the embodiments of the disclosure, the specified beam information may be at least one QCL Type D corresponding to the specified CORESET.

In the method for monitoring a PDCCH according to the embodiments of the disclosure, the terminal may be configured with one or more serving cells. Each serving cell correspondingly has a serving cell index.

In the method for monitoring a PDCCH according to the embodiments of the disclosure, CORESETs corresponding to a plurality of PDCCH candidates that the terminal needs to monitor at the overlapping PDCCH monitoring occasion may be configured with a common search space set (CSS set). The CSS set correspondingly has a CSS set index.

In the method for monitoring a PDCCH according to the embodiments of the disclosure, CORESETs corresponding to a plurality of PDCCH candidates that the terminal needs to monitor at the overlapping PDCCH monitoring occasion may be configured with a UE-specific search space set (USS set). The USS set correspondingly has a USS set index.

In an implementation of the embodiment of the disclosure, when one or more specified CORESETs or one or more pieces of specified beam information are determined, one or more specified CORESETs or one or more pieces of specified beam information may be determined based on at least one piece of the following information:

serving cell indexes of CORESETs corresponding to a plurality of PDCCH candidates that need to be monitored at the overlapping occasion; whether the CORESETs corresponding to the plurality of PDCCH candidates that need to be monitored at the overlapping occasion include a CSS set; an index of the CSS set included in the CORESETs corresponding to the plurality of PDCCH candidates that need to be monitored at the overlapping occasion; an index of a USS set of the CORESETs corresponding to the plurality of PDCCH candidates that need to be monitored at the overlapping occasion; or a number of TCI states configured by CORESETs corresponding to the plurality of PDCCH candidates that need to be monitored at the overlapping occasion.

In an implementation, the embodiment of the disclosure may determine, based on at least one of the serving cell indexes, whether a CSS set is included, the index of the CSS set, the index of the USS set, or the number of TCI states, one or more specified CORESETs among the CORESETs corresponding to the plurality of PDCCH candidates that need to be monitored at the overlapping occasion, and/or beam information of the specified CORESET is determined as the one or more pieces of specified beam information.

FIG. 3 is a flowchart illustrating a method for monitoring a PDCCH according to an embodiment. The method for monitoring a PDCCH may be executed alone or in combination with other embodiments of the disclosure. As shown in FIG. 3, the method for monitoring a PDCCH includes the following steps.

At S21, a CORESET that includes a CSS set is selected among the CORESETs corresponding to the plurality of PDCCH candidates that need to be monitored at the overlapping occasion.

At S22, a serving cell with a smallest serving cell index is selected among serving cells of the CORESET that includes the CSS set.

At S23, a CSS set with a smallest CSS set index is determined in the serving cell with the smallest serving cell index, and a CORESET corresponding to the CSS set with the smallest CSS set index is determined as the specified CORESET, and/or at least one piece of beam information of the CORESET corresponding to the CSS set with the smallest CSS set index is determined as the specified beam information.

In the method for monitoring a PDCCH according to the embodiment of the disclosure, the priority of CORESETs or the priority of search spaces corresponding to the plurality of PDCCH candidates that need to be monitored at the overlapping occasion may be determined based on at least one of the serving cell indexes, whether a CSS set is included, the index of the CSS set, the index of the USS set, or the number of TCI states. The specified CORESET is determined based on the priority of the CORESETs or the priority of the search spaces, among the plurality of PDCCH candidates, and/or the beam information of the specified CORESET is determined as the specified beam information.

In an example, it is assumed that there are CSS set #0, CSS set #1, USS set #2, and USS set #3 at the overlapping monitor occasion, and the following condition 1 is satisfied:

i. CSS set #0 corresponds to CORESET #0, serving cell #0, ii. CSS set #1 corresponds to CORESET #1, serving cell #0, iii. USS set #2 corresponds to CORESET #2, serving cell #1, iv. USS set #3 corresponds to CORESET #3, serving cell #1, Therefore, for the above condition 1, the priority order is CORESET #0>CORESET #1>CORESET #2>CORESET #3 or it may also be understood as CSS set #0>CSS set #1>USS set #2>USS set #3.

When selecting CORESET or QCL Type D, the selection may be made in the above priority order determined based on condition 1. When each CORESET corresponds to one TCI state, the priority of the CORESETs is the same as the priority of the search spaces.

In another example, it is assumed that there are CSS set #0, CSS set #1, USS set #2, and USS set #3 on overlapping monitor occasions, and the following condition 2 is satisfied:

i. CSS set #0 corresponds to CORESET #0, serving cell #0, ii. CSS set #1 corresponds to CORESET #0, serving cell #0, iii. USS set #2 corresponds to CORESET #1, serving cell #1, iv. USS set #3 corresponds to CORESET #2, serving cell #1, For the above condition 2, the priority order is CORESET #0 CSS set #0>CORESET #0 CSS set #1>CORESET #1>CORESET #2 or it may also be understood as CSS set #0>CSS set #1>USS set #2>USS set #3.

When selecting CORESET or QCL Type D, the selection may be made in the above priority order determined based on condition 2. Here, since CSS set #0 and CSS set #1 correspond to the same CORESET #0 but they correspond to different TCI states, CORESET or QCL Type D is determined actually according to the priority of the search space set. That is, when CORESET #0 corresponds to a plurality of TCI states, a TCI state corresponding to CSS set #0 is selected to determine the QCL Type D.

In the method for monitoring a PDCCH according to the embodiment of the disclosure, when the specified CORESET or specified QCL Type D is determined, if all the CORESETs do not include a CSS, they may be determined based on the USS. For example, a CORESET corresponding to a USS set with a smallest USS set index in a cell of the USS set with the smallest serving cell index may be selected.

FIG. 4 is a flowchart illustrating a method for monitoring a PDCCH according to an embodiment. The method for monitoring a PDCCH may be executed alone or in combination with other embodiments of the disclosure. As shown in FIG. 4, the method for monitoring a PDCCH includes the following steps.

At S31, a CORESET that includes a USS set is selected among the CORESETs corresponding to the plurality of PDCCH candidates that need to be monitored at the overlapping occasion.

At S32, a serving cell with a smallest serving cell index is selected among serving cells of the CORESET that includes the USS set.

At S33, a USS set with a smallest USS set index is determined in the serving cell with the smallest serving cell index, and a CORESET corresponding to the USS set is determined as the specified CORESET, and/or at least one piece of beam information of the CORESET corresponding to the USS set with the smallest USS set index is determined as the specified beam information.

It may be understood that when the CORESET and/or QCL Type D shown in FIG. 3 and FIG. 4 are determined in the above embodiments of the disclosure, CORESET and/or QCL Type D are determined based on the CSS set with the smallest serving cell index and the smallest search space set index or selecting the USS set with the smallest serving cell index and the smallest search space set index. This is only a schematic explanation. The embodiments of the disclosure may also adopt other methods. For example, determination of CORESET and/or QCL Type D is performed based on the CSS set with the largest serving cell index and/or the largest search space set index, or selecting the USS set with the largest serving cell index and/or the largest search space set index.

In an implementation, in the method for monitoring a PDCCH according to the embodiments of the disclosure, the specified CORESET may include one or more CORESETs.

Each CORESET in one or more specified CORESETs is configured with one or more TCI states.

In an implementation, a plurality of specified CORESETs may be determined in the embodiments of the disclosure, and each specified CORESET among the plurality of specified CORESETs is configured with one or more TCI states.

Figure 5:
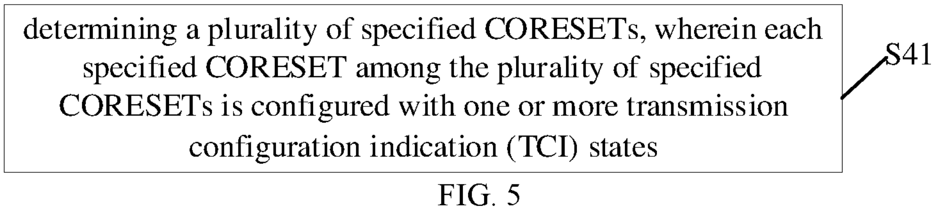
FIG. 5 is a flowchart illustrating a method for monitoring a PDCCH according to an embodiment.

FIG. 5 is a flowchart illustrating a method for monitoring a PDCCH according to an embodiment. The method for monitoring a PDCCH may be executed alone or in combination with other embodiments of the disclosure. As shown in FIG. 5, the process of determining the specified CORESET in the method for monitoring a PDCCH includes the following steps.

At S41, a plurality of specified CORESETs are determined, each of which is configured with one or more TCI states.

In the embodiment of the disclosure, it is assumed that each of the specified CORESETs determined is configured with one or more TCI states. One of the specified TCI states is determined for each specified CORESET. The determination method may be performed based on a TCI state corresponding to a search space set with the highest priority in any one embodiment of the disclosure. It is monitored at the overlapping occasion that PDCCHs of the plurality of specified CORESETs, and PDCCHs of other CORESETs whose beam information is the same as at least one piece of beam information for the plurality of specified TCI states corresponding to the plurality of specified CORESETs.

In another implementation, one specified CORESET may be determined in the embodiment of the disclosure, and one specified CORESET may be configured with a plurality of TCI states.

Figure 6:
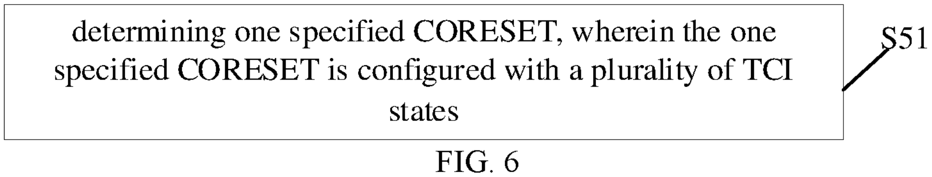
FIG. 6 is a flowchart illustrating a method for monitoring a PDCCH according to an embodiment.

FIG. 6 is a flowchart illustrating a method for monitoring a PDCCH according to an embodiment. The method for monitoring a PDCCH may be executed alone or in combination with other embodiments of the disclosure. As shown in FIG. 6, the process of determining the specified CORESET in the method for monitoring a PDCCH includes the following steps.

At S51, one specified CORESET is determined, and the one specified CORESET is configured with a plurality of TCI states.

In the embodiment of the disclosure, it is assumed that the specified CORESET determined is one specified CORESET, and the one specified CORESET is configured with a plurality of TCI states. One of the specified TCI states may be determined. The determination method may be performed based on a TCI state corresponding to a search space set with the highest priority in any one embodiment of the disclosure. It is monitored at the overlapping occasion that a PDCCH of the specified CORESET and a PDCCH of another CORESET whose beam information is the same as at least one piece of beam information for the plurality of specified TCI states corresponding to the specified CORESET.

In the embodiment of the disclosure, it is assumed that the specified CORESET determined includes a first specified CORESET, it may be determined whether another CORESET (hereinafter referred to as the second specified CORESET) is included based on a TCI state configuration of the first specified CORESET.

In an example, when the first specified CORESET is a CORESET configured with only one TCI state, the second specified CORESET needs to be determined. That is, the specified CORESET includes a first specified CORESET configured with one TCI state. PDCCHs of the first specified CORESET and the second specified CORESET, and a PDCCH of another CORESET are monitored at the overlapping occasion, in which beam information of another CORESET is the same as that beam information corresponding to at least one TCI state of the first specified CORESET and/or the second specified CORESET.

In another example, when the first specified CORESET is a CORESET configured with two TCI states, if the determined CSS set with the highest priority corresponds to two TCI states, there is no need to determine the second specified CORESET. That is, the specified CORESET includes a first specified CORESET configured with a plurality of TCI states, and the CSS set of the first specified CORESET corresponds to a plurality of TCI states. A PDCCH of the first specified CORESET and a PDCCH of another CORESET are monitored at the overlapping occasion, in which beam information of the another CORESET is the same as at least one piece of beam information corresponding to the plurality of TCI states configured by the first specified CORESET.

In another example, when the first specified CORESET is a CORESET configured with two TCI states, if the determined CSS set with the highest priority corresponds to one of the two TCI states, the second specified CORESET needs to be determined. That is, if the specified CORESET includes a first specified CORESET configured with a plurality of TCI states, and the CSS set of the first specified CORESET corresponds to one of the TCI states, then beam information that corresponds to the one TCI state corresponding to the CSS set is determined as first specified beam information. PDCCHs of the first specified CORESET and the second specified CORESET, and a PDCCH of another CORESET are monitored the at the overlapping occasion, in which beam information of another CORESET is the same as the first specified beam information corresponding to the TCI state of the first specified CORESET or beam information corresponding to at least one TCI state of the second specified CORESET.

In the embodiment of the disclosure, if a plurality of specified CORESETs are determined, at least one of the following conditions must be satisfied between the plurality of specified CORESETs.

A). the plurality of specified CORESETs respectively correspond to different transmission and reception points.

B) the plurality of specified CORESETs correspond to different CORESET pool indexes.

C) the plurality of specified CORESETs correspond to different physical cell identities.

D) beams corresponding to the plurality of specified CORESETs are beams that the terminal may receive simultaneously, and/or beams received by different panels of the terminal.

In an implementation, beams corresponding to pieces of specified beam information are beams that the terminal may receive simultaneously, and/or beams received by different panels of the terminal.

Based on the above limiting conditions, in the embodiment of the disclosure, when the plurality of CORESETs include the first specified CORESET and the second specified CORESET, that is, the situation where there is a need to select the second specified CORESET in the above embodiments, the second specified CORESET may be selected from other CORESETs except the first specified CORESET, after in the first specified CORESET is selected. The selection method of the second specified CORESET may be the same as that of the first specified CORESET. Alternatively, the selection method of the second specified CORESET may be different from that of the first specified CORESET. In an example, the second CORESET in the embodiments of the disclosure is a CORESET corresponding to a USS set with a smallest USS set index in a cell including the USS set with a smallest serving cell index (since the first CORESET may already contain the CSS set, the second CORESET is determined based on the USS set). However, the second specified CORESET may only select the QCL Type D corresponding to one TCI state (even if the second specified CORESET is configured with two TCI states).

In the method for monitoring a PDCCH according to the embodiments of the disclosure, after the specified CORESET is determined, one or more pieces of specified beam information may be determined based on a TCI state configured by the specified CORESET.

In an implementation, pieces of specified beam information may be determined based on the TCI state configured by the specified CORESET in the embodiments of the disclosure.

Figure 7:
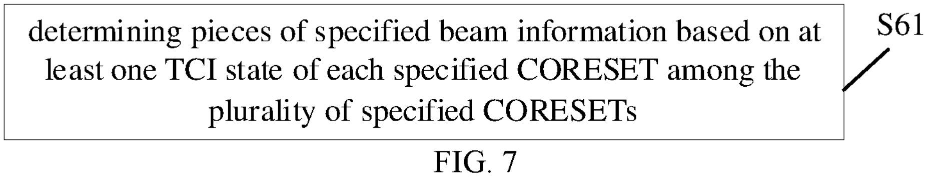
FIG. 7 is a flowchart illustrating a method for monitoring a PDCCH according to an embodiment.

FIG. 7 is a flowchart illustrating a method for monitoring a PDCCH according to an embodiment. The method for monitoring a PDCCH may be executed alone or in combination with other embodiments of the disclosure. As shown in FIG. 7, the process of determining the specified beam information in the method for monitoring a PDCCH includes the following steps.

At S61, pieces of specified beam information are determined based on at least one TCI state of each specified CORESET among the plurality of specified CORESETs.

In the embodiment of the disclosure, when a CORESET is configured with a plurality of TCI states, one of which may be selected to determine a specified beam direction. The selection method may be performed based on a TCI state corresponding to a search space set with the highest priority described in any one embodiment of the disclosure.

In an implementation, one piece of specified beam information may be determined based on a TCI state of the specified CORESET configuration in the embodiment of the disclosure.

Figure 8:
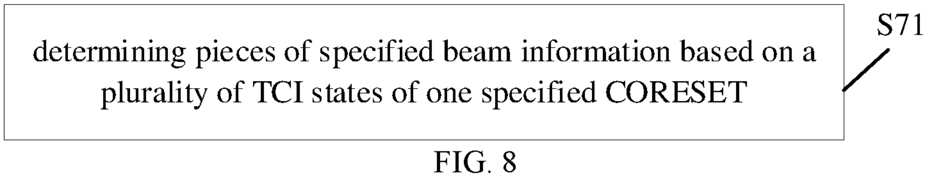
FIG. 8 is a flowchart illustrating a method for monitoring a PDCCH according to an embodiment.

FIG. 8 is a flowchart illustrating a method for monitoring a PDCCH according to an embodiment. The method for monitoring a PDCCH may be executed alone or in combination with other embodiments of the disclosure. As shown in FIG. 8, the process of determining the specified beam information in the method for monitoring a PDCCH includes the following steps.

At S71, pieces of specified beam information are determined based on a plurality of TCI states of one specified CORESET.

When the plurality of TCI states are configured for the specified CORESET, the beam information corresponding to the plurality of TCI states may be determined as pieces of specified beam information. The plurality of TCI states may correspond to the same or different search space sets.

In the method for monitoring a PDCCH according to the embodiments of the disclosure, the beams corresponding to the pieces of specified beam information are beams that the terminal may receive simultaneously, and/or beams received by different panels of the terminal.

In the method for monitoring a PDCCH according to the embodiment of the disclosure, when a plurality of PDCCH candidates are determined to overlap at a monitor occasion, one or more QCL Type Ds corresponding to one or more CORESETs are determined to monitor the PDCCH on the overlapping occasion, which may improve the PDCCH reception success rate.

It should be noted that, those skilled in the art may understand that the various implementations/embodiments mentioned above in the embodiments of the disclosure may be used in conjunction with the foregoing embodiments or may be used independently. Whether used alone or in conjunction with the foregoing embodiments, the implementation principles are similar. In the implementation of the disclosure, some embodiments are described in terms of implementations used together. Of course, those skilled in the art may understand that such illustrations do not limit the embodiments of the disclosure.

Based on the same concept, an embodiment of the disclosure also provides an apparatus for monitoring a PDCCH.

It may be understood that, in order to implement the above functions, the apparatus for monitoring a PDCCH according to the embodiment of the disclosure includes corresponding hardware structures and/or software modules for performing each function. Combined with the units and algorithm steps of each example disclosed in the embodiments of the disclosure, the embodiments of the disclosure may be implemented in the form of hardware or a combination of hardware and computer software. Whether a function is performed by hardware or by computer software driving the hardware depends on a specific application and design constraints of the technical solution. Those skilled in the art may use different methods to implement the described functions for each specific application, but such implementation should not be considered to go beyond the scope of the technical solutions of the embodiments of the disclosure.

Figure 9:
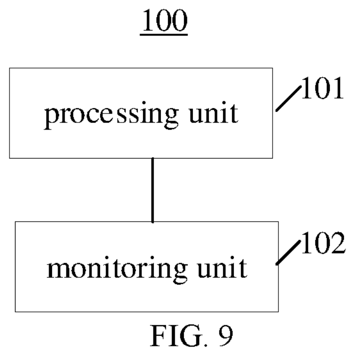
FIG. 9 is a block diagram illustrating an apparatus for monitoring a PDCCH according to an embodiment.

FIG. 9 is a block diagram of a device for monitoring a PDCCH according to an embodiment. Referring to FIG. 9, the device 100 for monitoring a PDCCH includes a processing unit 101 and a monitoring unit 102.

The processing unit 101 is configured to determine one or more specified CORESETs and/or one or more pieces of specified beam information, in response to a terminal needing to monitor a plurality of PDCCHs at an overlapping occasion.

The monitoring unit 102 is configured to monitor a PDCCH of the specified CORESET and a PDCCH of another CORESET with same beam information as the specified CORESET at the overlapping occasion, or monitor a PDCCH of a CORESET with beam information being the same as at least one piece of specified beam information at the overlapping occasion.

In an implementation, the processing unit 101 determines one or more specified CORESETs and/or one or more pieces of specified beam information based on at least one piece of the following information: serving cell indexes of CORESETs corresponding to a plurality of PDCCH candidates that need to be monitored at the overlapping occasion; whether CORESETs corresponding to a plurality of PDCCH candidates that need to be monitored at the overlapping occasion include a CSS set; an index of the CSS set included in CORESETs corresponding to a plurality of PDCCH candidates that need to be monitored at the overlapping occasion; an index of a USS set of CORESETs corresponding to a plurality of PDCCH candidates that need to be monitored at the overlapping occasion; or a number of TCI states configured by CORESETs corresponding to a plurality of PDCCH candidates that need to be monitored at the overlapping occasion.

In an implementation, the processing unit 101 determines one or more specified CORESETs and/or one or more pieces of specified beam information in the following way: determining, based on at least one of the serving cell indexes, whether the CSS set is included, the index of the CSS set, the index of the USS set, or the number of TCI states, one or more specified CORESETs among the CORESETs corresponding to the plurality of PDCCH candidates that need to be monitored at the overlapping occasion, and/or determining beam information of the specified CORESET as the one or more pieces of specified beam information.

In an implementation, the processing unit 101 determines one or more specified CORESETs and/or one or more pieces of specified beam information in the following way: selecting a CORESET that includes a CSS set among the CORESETs corresponding to the plurality of PDCCH candidates that need to be monitored at the overlapping occasion; selecting a serving cell with a smallest serving cell index among serving cells of the CORESET that includes the CSS set; and determining a CSS set with a smallest CSS set index in the serving cell with the smallest serving cell index, determining a CORESET corresponding to the CSS set with the smallest CSS set index as the specified CORESET, and/or determining at least one piece of beam information of a CORESET corresponding to the CSS set with the smallest CSS set index as the specified beam information In an implementation, the processing unit 101 determines one or more specified CORESETs and/or one or more pieces of specified beam information in the following way: selecting a CORESET that includes a USS set among the CORESETs corresponding to the plurality of PDCCH candidates that need to be monitored at the overlapping occasion; selecting a serving cell with a smallest serving cell index among serving cells of the CORESET that includes the USS set; and determining a USS set with a smallest USS set index in the serving cell with the smallest serving cell index, determining a CORESET corresponding to the USS set as the specified CORESET, and/or determining at least one piece of beam information of a CORESET corresponding to the USS set with the smallest USS set index as the specified beam information.

In an implementation, each CORESET in one or more specified CORESETs is configured with one or more TCI states.

In an implementation, in response to the terminal needing to monitor the plurality of PDCCHs at the overlapping occasion, the processing unit 101 determines the plurality of specified CORESETs, in which each specified CORESET among the plurality of specified CORESETs is configured with one or more TCI states.

In an implementation, the processing unit 101 determines pieces of specified beam information based on at least one TCI state of each specified CORESET among the plurality of specified CORESETs.

In an implementation, in response to the terminal needing to monitor the plurality of PDCCHs at the overlapping occasion, the processing unit 101 determines one specified CORESET, in which the one specified CORESET is configured with a plurality of TCI states.

In an implementation, the processing unit 101 determines pieces of specified beam information based on a plurality of TCI states of the one specified CORESET.

In an implementation, at least one of the following conditions is satisfied between the plurality of specified CORESETs: the plurality of specified CORESETs respectively correspond to different transmission and reception points; the plurality of specified CORESETs correspond to different CORESET pool indexes; the plurality of specified CORESETs correspond to different physical cell identities; or beams corresponding to the plurality of specified CORESETs are beams that the terminal may receive simultaneously, and/or beams received by different panels of the terminal.

In an implementation, beams corresponding to the pieces of specified beam information are beams that the terminal may receive simultaneously, and/or beams received by different panels of the terminal.

Regarding the apparatus in the above embodiments, the specific way in which each module performs operations has been described in detail in the embodiments related to the method, which will not be described in detail here.

Figure 10:
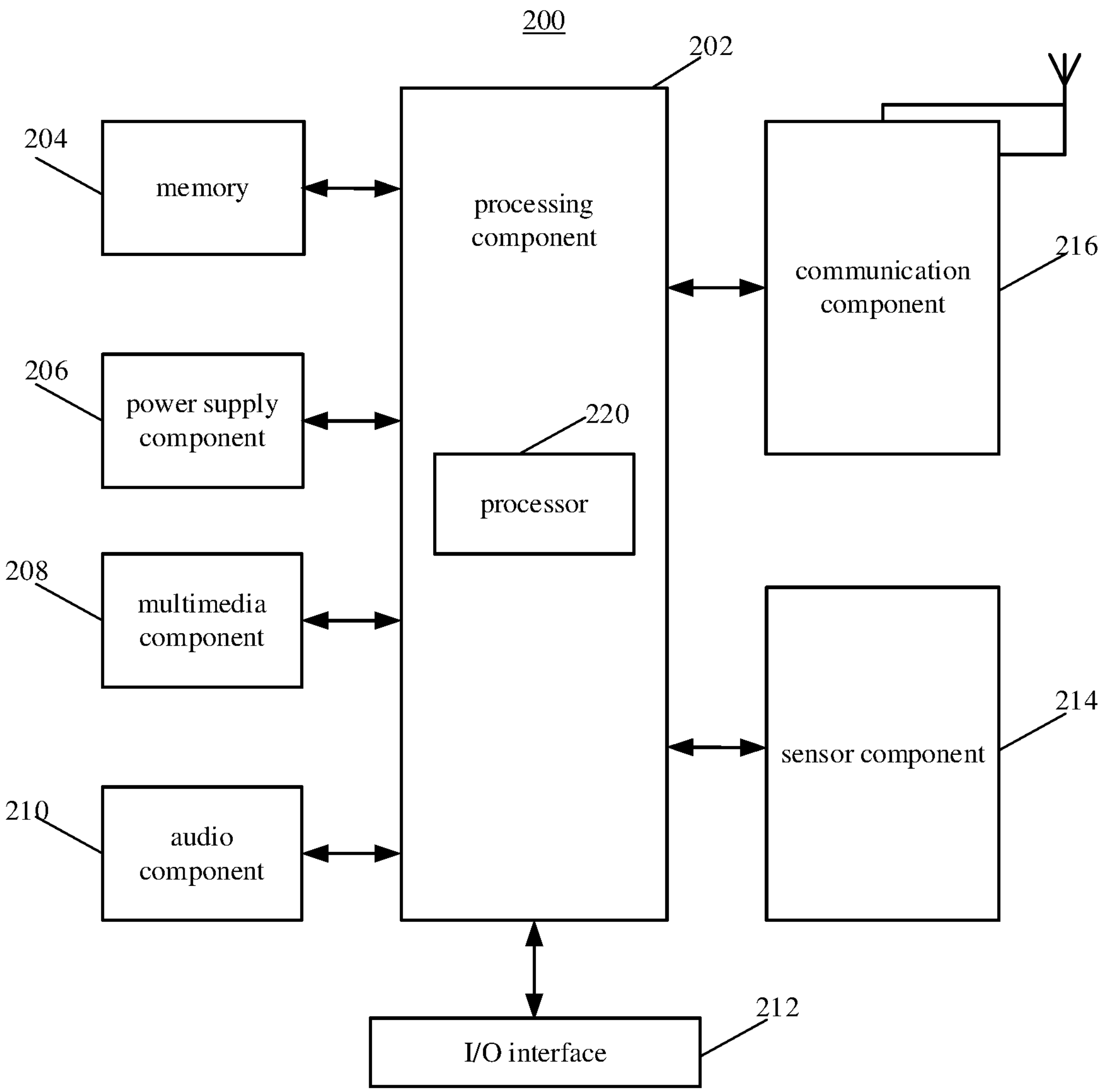
FIG. 10 is a block diagram illustrating a device for monitoring a PDCCH according to an embodiment.

FIG. 10 is a block diagram of a device 200 for monitoring a PDCCH according to an embodiment. For example, the device 200 may be a mobile phone, a computer, a digital broadcast terminal, a messaging device, a game console, a tablet device, a medical device, a fitness device, a personal digital assistant, or the like.

Referring to FIG. 10, the device 200 may include one or more of the following components: a processing component 202, a memory 204, a power component 206, a multimedia component 208, an audio component 210, an input/output (I/O) interface 212, a sensor component 214, and a communication component 216.

The processing component 202 generally controls the overall operations of the device 200, such as the operations associated with display, a phone call, data communication, a camera operation and a recording operation. The processing component 202 may include one or more processors 220 to execute instructions to complete all or part of the steps of the above method. Additionally, the processing component 202 may include one or more modules that facilitate interactions between the processing component 202 and other components. For example, the processing component 202 may include a multimedia module to facilitate interactions between the multimedia component 208 and the processing component 202.

The memory 204 is configured to store various types of data to support operations at the device 200. Examples of such data include instructions for any application or methods operating on the device 200, contact data, phonebook data, messages, pictures, videos, etc. The memory 204 may be implemented by any type of volatile or non-volatile storage device, or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk or an optical disk.

The power component 206 provides powers to various components of the device 200. The power components 206 may include a power management system, one or more power supplies, and other components associated with generating, managing, and distributing powers for the device 200.

The multimedia component 208 includes a screen that provides an output interface between the device 200 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense touches, swipes, and gestures on the touch panel. The touch sensor may not only sense the boundary of a touch or slide action, but also detect the duration and pressure associated with the touch or slide action. In some embodiments, the multimedia component 208 includes a front camera and/or a rear camera. When the device 200 is in an operating mode, such as a shooting mode or a video mode, the front camera and/or the rear camera may receive external multimedia data. Each of the front camera and rear camera may be a fixed optical lens system or have a focal length and optical zoom capabilities.

The audio component 210 is configured to output and/or input audio signals. For example, audio component 210 includes a microphone (MIC) configured to receive external audio signals when the device 200 is in an operating mode, such as a call mode, a record mode, and a speech recognition mode. The received audio signals may be further stored in the memory 204 or sent via the communications component 216. In some embodiments, the audio component 210 also includes a speaker for outputting audio signals.

The I/O interface 212 provides an interface between the processing component 202 and a peripheral interface module, which may be a keyboard, a click wheel, a button, etc. These buttons may include, but are not limited to: a home button, a volume button, a start button and a lock button.

The sensor component 214 includes one or more sensors for providing various aspects of status assessment for the device 200. For example, the sensor component 214 may detect an on/off state of the device 200, a relative positioning of components, such as the display and keypad of the device 200. The sensor component 214 may also detect a location change of the device 200 or a component of the device 200, a presence or absence of user contact with the device 200, an orientation or acceleration/deceleration of the device 200 and temperature changes of the device 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an acceleration sensor, a gyroscope sensor, a magnetic sensor, a pressure sensor, or a temperature sensor.

The communication component 216 is configured to facilitate wired or wireless communication between the device 200 and other devices. The device 200 may access a wireless network based on a communication standard, such as WiFi, 2G or 3G, or their combination. In an embodiment, the communication component 216 receives broadcast signals or broadcast related information from an external broadcast management system via a broadcast channel. In an embodiment, the communications component 216 also includes a near field communications (NFC) module to facilitate short-range communications. For example, the NFC module may be implemented based on radio frequency identification (RFID) technology, infrared data association (IrDA) technology, ultra-wideband (UWB) technology, Bluetooth (BT) technology and other technologies.

In an embodiment, the device 200 may be implemented by one or more application specific integrated circuits (ASICs), digital signal processors (DSPs), digital signal processing devices (DSPDs), programmable logic devices (PLDs), f field programmable gate arrays (FPGA), controllers, micro control units (MCUs), microprocessors or other electronics components.

In an embodiment, a non-transitory computer-readable storage medium including instructions is further provided, such as the memory 204 including instructions, which may be executed by the processor 220 of the device 200 to complete the above method. For example, the non-transitory computer-readable storage medium may be a ROM, a random access memory (RAM), a CD-ROM, a magnetic tape, a floppy disk, an optical data storage device, etc.

In an example of the disclosure, a method for monitoring a PDCCH includes: in response to a terminal needing to monitor a plurality of PDCCHs at an overlapping occasion, determining one or more specified CORESETs and/or one or more pieces of specified beam information; and monitoring a PDCCH of the specified CORESET and a PDCCH of another CORESET with same beam information as the specified CORESET at the overlapping occasion, or monitoring a PDCCH of a CORESET with beam information being the same as the specified beam information at the overlapping occasion.

In an example of the disclosure, one or more specified CORESETs and/or one or more pieces of specified beam information are determined based on at least one piece of the following information: serving cell indexes of CORESETs corresponding to a plurality of PDCCH candidates that need to be monitored at the overlapping occasion; whether CORESETs corresponding to a plurality of PDCCH candidates that need to be monitored at the overlapping occasion include a common search space (CSS) set; an index of the CSS set included in CORESETs corresponding to a plurality of PDCCH candidates that need to be monitored at the overlapping occasion; an index of a UE-specific search space (USS) set of CORESETs corresponding to a plurality of PDCCH candidates that need to be monitored at the overlapping occasion; or a number of transmission configuration indication (TCI) states configured by CORESETs corresponding to a plurality of PDCCH candidates that need to be monitored at the overlapping occasion.

In an example of the disclosure, determining one or more specified CORESETs and/or one or more pieces of specified beam information includes: determining, based on at least one of the serving cell indexes, whether the CSS set is included, the index of the CSS set, the index of the USS set, or the number of TCI states, one or more specified CORESETs among the CORESETs corresponding to the plurality of PDCCH candidates that need to be monitored at the overlapping occasion, and/or determining beam information of the specified CORESET as the one or more pieces of specified beam information.

In an example of the disclosure, determining one or more specified CORESETs and/or one or more pieces of specified beam information includes: selecting a CORESET that includes a CSS set among the CORESETs corresponding to the plurality of PDCCH candidates that need to be monitored at the overlapping occasion; selecting a serving cell with a smallest serving cell index among serving cells of the CORESET that includes the CSS set; and determining a CSS set with a smallest CSS set index in the serving cell with the smallest serving cell index, determining a CORESET corresponding to the CSS set with the smallest CSS set index as the specified CORESET, and/or determining at least one piece of beam information of a CORESET corresponding to the CSS set with the smallest CSS set index as the specified beam information.

In an example of the disclosure, determining one or more specified CORESETs and/or one or more pieces of specified beam information includes: selecting a CORESET that includes a USS set among the CORESETs corresponding to the plurality of PDCCH candidates that need to be monitored at the overlapping occasion; selecting a serving cell with a smallest serving cell index among serving cells of the CORESET that includes the USS set; and determining a USS set with a smallest USS set index in the serving cell with the smallest serving cell index, determining a CORESET corresponding to the USS set as the specified CORESET, and/or determining at least one piece of beam information of a CORESET corresponding to the USS set with the smallest USS set index as the specified beam information.

In an example of the disclosure, each specified CORESET in the one or more specified CORESETs is configured with one or more TCI states.

In an example of the disclosure, in response to the terminal needing to monitor the plurality of PDCCHs at the overlapping occasion, determining one or more specified CORESETs and/or one or more pieces of specified beam information includes: determining one specified CORESETs, and the one specified CORESET is configured with one TCI state.

In an example of the disclosure, the specified beam information is determined based on the one TCI state.

In an example of the disclosure, in response to the terminal needing to monitor the plurality of PDCCHs at the overlapping occasion, determining one or more specified CORESETs and/or one or more pieces of specified beam information includes: determining a plurality of specified CORESETs, and each specified CORESET among the plurality of specified CORESETs is configured with one or more TCI states.

In an example of the disclosure, pieces of specified beam information are determined based on at least one TCI state of each specified CORESET among the plurality of specified CORESETs.

In an example of the disclosure, in response to the terminal needing to monitor the plurality of PDCCHs at the overlapping occasion, determining one or more specified CORESETs and/or one or more pieces of specified beam information includes: determining one specified CORESET, and the one specified CORESET is configured with a plurality of TCI states.

In an example of the disclosure, pieces of specified beam information are determined based on the plurality of TCI states of the one specified CORESET.

In an example of the disclosure, at least one of the following conditions is satisfied between the plurality of specified CORESETs: the plurality of specified CORESETs respectively correspond to different transmission and reception points; the plurality of specified CORESETs correspond to different CORESET pool indexes; the plurality of specified CORESETs correspond to different physical cell identities; or beams corresponding to the plurality of specified CORESETs are beams that the terminal may receive simultaneously, and/or beams received by different panels of the terminal.

In an example of the disclosure, beams corresponding to the pieces of specified beam information are beams that the terminal may receive simultaneously, and/or beams received by different panels of the terminal.

In an example of the disclosure, an apparatus for monitoring a PDCCH includes: a processing unit, configured to determine one or more specified CORESETs and/or one or more pieces of specified beam information, in response to a terminal needing to monitor a plurality of PDCCHs at an overlapping occasion; and a monitoring unit, configured to monitor a PDCCH of the specified CORESET and a PDCCH of another CORESET with same beam information as the specified CORESET at the overlapping occasion, or monitor a PDCCH of a CORESET with beam information being the same as the specified beam information at the overlapping occasion.

In an example of the disclosure, a device for monitoring a PDCCH includes: a processor and a memory for storing instructions executable by the processor. The processor is configured to execute the method for monitoring a PDCCH as described above.

In an example of the disclosure, a storage medium storing instructions, wherein when the instructions are executed by a processor of a terminal, the terminal is caused to execute the method for monitoring a PDCCH as described above.

It may be further understood that "a plurality of" in the disclosure refers to two or more, and other quantifiers are similar. "And/or" describes a relationship between related objects, indicating that there may be three relationships. For example, A and/or B may mean: A exists alone, A and B exist simultaneously, and B exists alone. The character "/" generally indicates that the related objects are in an "or" relationship. The singular forms "a/an", "said" and "the" are intended to include the plural forms as well, unless the context clearly indicates otherwise.

It is further understood that the terms "first", "second", etc. are used to describe various information, but such information should not be limited to these terms. These terms are only used to distinguish information of the same type from each other and do not imply a specific order or importance. In fact, expressions such as "first" and "second" may be used interchangeably. For example, without departing from the scope of the disclosure, the first information may also be called second information, and similarly, second information may also be called first information.

It may be further understood that although the operations are described in a specific order in the drawings in the embodiments of the disclosure, it should not be understood as requiring that these operations are performed in the specific order shown or in a serial order, or requiring that all operations shown are performed to obtain the desired results. In certain circumstances, multitasking and parallel processing may be advantageous.

After considering the specification and practicing the disclosure herein, those skilled in the art will easily think of other embodiments of the present disclosure. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as only, and the true scope of the present disclosure are given by the appended claims.

It should be understood that the disclosure is not limited to the precise structures described above and illustrated in the accompanying drawings, and various modifications and changes may be made without departing from its scope. The scope of the disclosure is limited only by the appended claims.

What is claimed is:

1. A method for monitoring a physical downlink control channel (PDCCH), the method comprising:

monitoring a plurality of PDCCHs at an overlapping occasion, determining one or more control resource sets (CORESETs) and a plurality of beams of the one or more CORESETs, wherein each CORESET in the one or more CORESETs is configured with one or more transmission configuration indication (TCI) states; and monitoring, at the overlapping occasion, a PDCCH of the one or more CORESETs and a PDCCH of another CORESET with a same beam as one of the plurality of beams of the one or more CORESETs;

wherein determining the one or more CORESETs comprises:

determining a first CORESET, wherein the first CORESET is configured with only one TCI state, and determining a second CORESET, wherein the one or more CORESETs comprises the first CORESET and the second CORESET.

2. The method according to claim 1, wherein the one or more CORESETs and the plurality of beams are determined based on at least one piece of the following information:

serving cell indexes of CORESETs corresponding to a plurality of PDCCH candidates that need to be monitored at the overlapping occasion;

information on whether CORESETs corresponding to a plurality of PDCCH candidates that need to be monitored at the overlapping occasion comprise a common search space (CSS) set;

an index of the CSS set comprised in CORESETs corresponding to a plurality of PDCCH candidates that need to be monitored at the overlapping occasion;

an index of a UE-specific search space (USS) set of CORESETs corresponding to a plurality of PDCCH candidates that need to be monitored at the overlapping occasion; or a number of transmission configuration indication (TCI) states configured by CORESETs corresponding to a plurality of PDCCH candidates that need to be monitored at the overlapping occasion.

3. The method according to claim 2, wherein determining the one or more CORESETs and the plurality of beams comprises at least one of:

determining, based on at least one of the serving cell indexes, whether the CSS set is comprised, the index of the CSS set, the index of the USS set, or the number of TCI states, one or more CORESETs among the CORESETs corresponding to the plurality of PDCCH candidates that need to be monitored at the overlapping occasion; or determining one or more beams of the one or more CORESETs as the plurality of beams.

4. The method according to claim 3, wherein determining the one or more CORESETs and the plurality of beams comprises:

selecting a CORESET that comprises a CSS set among the CORESETs corresponding to the plurality of PDCCH candidates that need to be monitored at the overlapping occasion;

selecting a serving cell with a smallest serving cell index among serving cells of the CORESET that comprises the CSS set; and determining a CSS set with a smallest CSS set index in the serving cell with the smallest serving cell index, and performing at least one of: determining a CORESET corresponding to the CSS set with the smallest CSS set index as the CORESET, or determining a beam of a CORESET corresponding to the CSS set with the smallest CSS set index as the beam.

5. The method according to claim 3, wherein determining the one or more CORESETs and the plurality of beams comprises:

selecting a CORESET that comprises a USS set among the CORESETs corresponding to the plurality of PDCCH candidates that need to be monitored at the overlapping occasion;

selecting a serving cell with a smallest serving cell index among serving cells of the CORESET that comprises the USS set; and determining a USS set with a smallest USS set index in the serving cell with the smallest serving cell index, and performing at least one of: determining a CORESET corresponding to the USS set with the smallest USS set index as the CORESET, or determining a beam of a CORESET corresponding to the USS set with the smallest USS set index as the beam.

6. The method according to claim 2, wherein determining the one or more CORESETs and the plurality of beams comprises:

selecting a CORESET that comprises a CSS set among the CORESETs corresponding to the plurality of PDCCH candidates that need to be monitored at the overlapping occasion;

selecting a serving cell with a smallest serving cell index among serving cells of the CORESET that comprises the CSS set; and determining a CSS set with a smallest CSS set index in the serving cell with the smallest serving cell index, and performing at least one of: determining a CORESET corresponding to the CSS set with the smallest CSS set index as the CORESET, or determining a beam of a CORESET corresponding to the CSS set with the smallest CSS set index as the beam.

7. The method according to claim 2, wherein determining the one or more CORESETs and the plurality of beams comprises:

selecting a CORESET that comprises a USS set among the CORESETs corresponding to the plurality of PDCCH candidates that need to be monitored at the overlapping occasion;

selecting a serving cell with a smallest serving cell index among serving cells of the CORESET that comprises the USS set; and determining a USS set with a smallest USS set index in the serving cell with the smallest serving cell index, and performing at least one of: determining a CORESET corresponding to the USS set with the smallest USS set index as the CORESET, or determining a beam of a CORESET corresponding to the USS set with the smallest USS set index as the beam.

8. The method according to claim 1, wherein determining the one or more CORESETs and the plurality of beams comprises:

determining one CORESET, wherein the one CORESET is configured with one TCI state.

9. The method according to claim 8, wherein one beam of the one CORESET is determined based on the one TCI state.

10. The method according to claim 1, wherein determining the one or more CORESETs and the plurality of beams comprises:

determining a plurality of CORESETs, wherein each CORESET among the plurality of CORESETs is configured with one or more TCI states.

11. The method according to claim 10, wherein the one or more beams are determined based on the one or more TCI states of each CORESET among the plurality of CORESETs.

12. The method according to claim 1, wherein determining the one or more CORESETs and the plurality of beams comprises:

determining one CORESET, wherein the one CORESET is configured with a plurality of TCI states.

13. The method according to claim 12, wherein the one or more beams are determined based on the plurality of TCI states of the one CORESET.

14. The method according to claim 1, wherein at least one of the following conditions is satisfied between a plurality of CORESETs:

the plurality of CORESETs respectively correspond to different transmission and reception points;

the plurality of CORESETs correspond to different CORESET pool indexes;

the plurality of CORESETs correspond to different physical cell identities; or beams corresponding to the plurality of CORESETs are beams that a terminal may receive simultaneously, and/or beams received by different panels of the terminal.

15. The method according to claim 1, wherein the plurality of beams are at least one of: beams that a terminal may receive simultaneously, or beams received by different panels of the terminal.

16. A device for monitoring a physical downlink control channel (PDCCH), comprising:

a processor; and a memory for storing instructions executable by the processor;

wherein the processor is configured to:

monitor a plurality of PDCCHs at an overlapping occasion, determine one or more control resource sets (CORESETs) and a plurality of beams of the one or more CORESETs, wherein each CORESET in the one or more CORESETs is configured with one or more transmission configuration indication (TCI) states; and monitor, at the overlapping occasion, a PDCCH of the one or more CORESETs and a PDCCH of another CORESET with a same beam as one of the plurality of beams of the one or more CORESETs;

wherein the processor is further configured to:

determine a first CORESET, wherein the first CORESET is configured with only one TCI state, and determine a second CORESET, wherein the one or more CORESETs comprises the first CORESET and the second CORESET.

17. A non-transitory storage medium storing instructions, wherein when the instructions are executed by a processor of a terminal, the terminal is caused to perform:

monitoring a plurality of physical downlink control channels (PDCCHs) at an overlapping occasion, determining one or more control resource sets (CORESETs) and a plurality of beams of the one or more CORESETs, wherein each CORESET in the one or more CORESETs is configured with one or more transmission configuration indication (TCI) states; and monitoring, at the overlapping occasion, a PDCCH of the one or more CORESETs and a PDCCH of another CORESET with a same beam as one of the plurality of beams of the one or more CORESETs;

wherein determining the one or more CORESETs comprises:

determining a first CORESET, wherein the first CORESET is configured with only one TCI state, and determining a second CORESET, wherein the one or more CORESETs comprises the first CORESET and the second CORESET.

* * * * *